(12) United States Patent
Macrae

(10) Patent No.: US 7,590,191 B1
(45) Date of Patent: Sep. 15, 2009

(54) MEANS FOR TRANSMITTING TWO SIGNALS ON THE SAME FREQUENCY AT THE SAME TIME FOR USE IN MOBILE AND FIXED APPLICATIONS

(76) Inventor: Nigel Macrae, 4709 Compass Bow La., Las Vegas, NV (US) 89130

( * ) Notice: Subject to any disclaimer, the term of this patent is extended or adjusted under 35 U.S.C. 154(b) by 575 days.

(21) Appl. No.: 11/415,821

(22) Filed: May 1, 2006

(51) Int. Cl.
*H04L 27/04* (2006.01)

(52) U.S. Cl. .................. 375/299; 375/146; 375/267; 455/101; 455/121; 455/129; 342/361

(58) Field of Classification Search .......... 375/141, 375/146, 147, 220, 256, 267, 299, 316; 455/91, 455/101, 121, 129, 130; 342/359–361, 363, 342/365; 343/765, 777, 909
See application file for complete search history.

(56) References Cited

U.S. PATENT DOCUMENTS 4,060,808 A * 11/1977 Foldes ..................... 342/352

7,003,058 B2 * 2/2006 Bach et al. ................. 375/346

* cited by examiner

*Primary Examiner*—Dac V Ha
(74) *Attorney, Agent, or Firm*—Ash Tankha

(57) ABSTRACT

The invention describes a technique for reusing radio frequencies, i.e., transmitting two signals on the same frequency at the same time. A signal is transmitted on one frequency in one pole. A second signal in the same frequency band is transmitted on one polarity and its inverse is transmitted on the opposite polarity. By using an antenna that receives equally both polarities of the second signal and the first signal, the two inverse signals cancel out, and the second signal can be received and detected. This signal is suitable for use in mobile applications. By using an antenna with the feed polarity aligned with the polarity of the second signal, and only receiving one polarity, the second signal can be received and detected. This is suited for fixed antenna sites, thus accomplishing frequency reuse.

9 Claims, 2 Drawing Sheets

Fig 1:

|  | LH Polarization | RH Polarization |  |
|---|---|---|---|
| What is transmitted: | SigA | SigA-Inv<br>SigB | =SigB |

Fig 2:

|  | LH Polarization | RH Polarization |  |
|---|---|---|---|
| What is transmitted: | SigA | SigA-Inv<br>SigB | =SigA |

Fig 3:

|  | LH Polarization | RH Polarization |  |
|---|---|---|---|
| What is transmitted: | SigA<br>SigB | SigA-Inv<br>SigB | =SigB |

Fig 4:

|  | LH Polarization | | RH Polarization |  |
|---|---|---|---|---|
| What is transmitted: | SigA<br>SigB | + | SigA-Inv<br>SigB | =SigB |

MEANS FOR TRANSMITTING TWO SIGNALS ON THE SAME FREQUENCY AT THE SAME TIME FOR USE IN MOBILE AND FIXED APPLICATIONS

BACKGROUND OF THE INVENTION

1. Field of Invention

This disclosure describes the means to transmit two signals on the same frequency at the same time while some of the receivers may be mobile and without tracking and others fixed. The invention is intended for use in radio frequency applications, and is intended to be used where information is being transmitted on radio frequency signals.

2. Prior Art

Frequency reuse means the simultaneous transmission of more than one signal on any particular frequency. This is usually accomplished by sending the signals in two different polarities. Examples are: horizontal and vertical polarization; and left and right circular polarization. The two signals do not interfere with each other because the polarities do not interact, allowing two signals to be transmitted in the same frequency. The receive antenna needs to have the same polarization scheme (linear of circular) and needs to be aligned with the transmitting antenna in order to be able to pick up each of the two transmitted signals separately.

One of the problems with communications between a mobile station and a fixed (base) station is that the polarity of the receiving station rotates in three axes in relation to the fixed transmitting station. The receiving antenna has no way to discriminate between the two transmitting polarities, unless you steer the receiving antenna and associated feed to align the antenna's polarity with the transmitting antenna. The receive antenna's polarity needs to be precisely aligned with the transmit antenna's polarity, precluding frequency reuse in mobile systems that do not have tracking. Tracking systems are not compact enough or cheap enough to incorporate into low cost mobile communication systems.

Consequently, when a base station transmits to a mobile receiving station which does not steer its antenna, only one signal instead of two can be transmitted. If two polarized signals on the same frequency were transmitted, both signals would be picked up by the receiving antenna. The power level of each signal would depend on the relationship of the polarization of the transmitting antenna to the receive antenna. Decoding either of the two signals would be difficult or impossible.

The technology described below allows for the use of one polarization for mobile (and fixed) uses and the other polarization for fixed uses, thus allowing for reuse of the same frequencies while maintaining the ability to transmit to mobile users. Bandwidth is tightly controlled by the FCC and in short supply, necessitating frequency reuse wherever possible.

The advantage of this means of communication is the efficient use of bandwidth. Most other techniques for improving bandwidth utilization (CDMA, spread spectrum, TDMA, demand assigned access, etc.) can be used in combination with this means.

SUMMARY

The disclosure describes a means for reusing radio frequencies. It allows for the transmission of two signals on the same frequency at the same time. The current technology to handle the situation when the receive antenna is mobile in relation to the transmit antenna, or vice versa, is to transmit the same signal on both polarities or in just one of the two with the other polarity not transmitting. In this described means, a signal is transmitted on one frequency in one pole. An inverse of the same signal is transmitted in the opposite polarity. Additionally, a second unique signal on the same frequency is transmitted on one of the two polarities. By using an antenna that receives equally both polarities of the transmission, the two inverse signals cancel out, and the second signal can be received and detected. This is ideal for mobile applications.

If a circular polarized receive antenna is used with a linear polarized transmission (signal), or a linear polarized signal is used to receive a circular polarized signal the relationship of the receive antenna to the transmitting antenna does not matter. The antenna will pick up a signal in any axis. This is ideal for situations where the receive antenna is mobile.

By using an antenna with the feed polarity aligned with the polarity of the first transmitted signal described above, thereby only receiving one polarity, the first signal can be received and detected. This is suited for fixed antenna sites where the transmit and receive antenna polarities can be precisely aligned.

BRIEF DESCRIPTION OF THE FIGURES

FIG. 1 shows when both polarizations are picked up together, SigA and SigA-Inv cancel resulting in only SigB going to the receiver.

FIG. 2 shows when only the LH polarization is picked up, only SigA is picked up and sent to the receiver.

FIG. 3 shows when SigA is transmitted in one polarity, and SigA-Inv is transmitted in the other, and SigB is transmitted in both polarities, SigB sums in the receive antenna and SigA and SigA-Inv cancel.

FIG. 4 shows similar conditions to FIG. 3, when both transmit polarizations are received as separate receive polarities; SigB is received by combining the two polarities as in FIG. 3. SigB is then subtracted from the combined SigA and SigB signal received in just the LH polarization, resulting in SigA.

DETAILED DESCRIPTION

Figure 5:
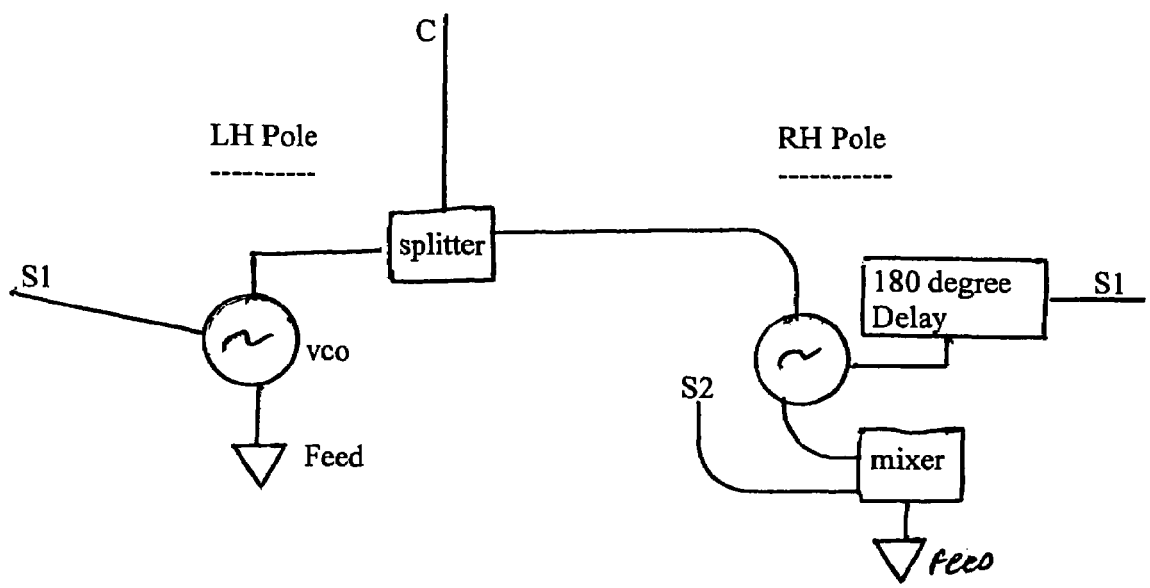
FIG. 5 shows S1 being a first information signal, C as a carrier signal. S2 is a second information signal. S and C are mixed and then combined with SigB then fed to one polarity of an antenna. S-Inv is a copy of S delayed 180 degrees. S-Inv and C are mixed and fed into the opposite pole.

An inverse signal is one that is 180 degrees out of phase with the first one, so that when the two signals are summed up they cancel each other out.

Polarity: signals can be transmitted with linear polarity, i.e., horizontal and vertical, in which the waves go up and down or side to side, or in circular polarity, in which the waves are propagated with a left handed rotation or a right handed rotation. Use of polarized signals is common in radio frequency transmissions, and these terms have the common usage. They can be also transmitted with left and right electron spin.

Decoding or detecting the signal refers to pulling the information off the carrier signal so that the information can be converted into bits which can be processed by circuitry or into an analog signal which can be fed into a receiver.

Mobile antennas refer to ones that shift in relationship to the transmitting antenna. Fixed antennas are not mobile and can keep their feed aligned with a transmitting antenna.

Carrier signal or carrier is a single frequency signal. Other signals may be used to modulate or encode a carrier signal.

This invention uses the fact that a circular pole antenna will pick up a linearly transmitted signal, but at a lower power level than a comparable linear antenna could; and that a linear polarized antenna will pick up a circular polarized transmission, but at a reduced level over a linear antenna. Secondly, a linear polarized antenna will pick up both circularized polarity signals of a transmission, roughly at equal gain. A circularly polarized antenna will pick up both linearly polarized transmissions at roughly the same gain.

A preferred embodiment of the invention is described as follows.

A single signal (SigA) is transmitted in one circular pole, in this example, the left circular pole (LCP). This is intended to be received by mobile users. Additionally, an exact copy of the second signal is transmitted 180 degrees out of phase of SigA in the opposite circular polarity, the right hand circular polarity (RCP). This is an exact opposite copy of the first signal, inverted (SigA-Inv) so that when the two copies are added together they cancel each other. SigA and SigA-Inv are transmitted at approximately the same power level, so that if they are received at the same signal strength, they will cancel. They are transmitted on different polarities so that they do not interfere. Additionally, a second signal (SigB) with different information than SigA is transmitted in the other of two circular polarities from SigA, in this example, the right hand polarity (RCP).

A linear antenna will pick up both polarities of the transmitted circular pole signals about equally. In other words, it will pick up SigA and SigA-Inv about equally; hence the two signals if transmitted at the same power level will cancel out in the antenna feed. SigB will be picked up as well, and will be detected and received normally (see FIG. 1). The relationship of the receiving antenna to the transmitting antenna is unimportant since SigA and SigA-Inv cancel and only SigB is picked up by the receiver.

However, in order to pick up SigA it is necessary to have a receive antenna that has a circular pole feed that picks up the right circular pole (RCP) with very little cross pole reception from the opposite pole. This antenna feed will need to be oriented in line precisely with transmitting signal in order to receive a strong signal. If it were in a mobile application, it would sometimes be 90 degrees off axis and incapable of picking up the signal, so it is envisioned that this would be used for fixed receive locations only, with the receive antenna aimed towards and aligned with the transmitting antenna. This antenna feed would only pick up SigA since only SigA is transmitted on this polarity (see FIG. 2.)

Alternate Embodiment

As above, SigA and SigA-inv are transmitted on opposite poles. A more complicated version of this invention would involve the simultaneous transmission of SigB on both poles, LHC and RHC (See FIG. 3). The mobile units with linear antennas would pick up SigB both poles and the combined SigA and SigA-inv signals. SigA and SigA-Inv would cancel, resulting in just the SigB signal going to the receiver. This would result in a stronger SigB than the first example, since the two SigB signals would combine in the antenna, effectively doubling the receive power of the signal. This would compensate for the three db loss of using a linear antenna to pick a circular pole transmission.

In order to detect SigA, the receive antenna would have to pick up both circular poles separately. The LHC and RHC signals are combined to result in just the SigB signal. SigB would then be subtracted from the signal arriving in just the right pole (SigA and SigB combined), winding up with just SigA (See FIG. 4).

The construction of the receive antenna needs to be such that both poles of the transmit source are picked up equally in the antenna. Using a circular feed source and a linear pickup solves this problem.

The above system would also work with the signals being transmitted in linear pole instead of circular and picked up in circular instead of linear.

SigB does not need to be transmitted on the same antenna or location as SigA and SigA-Inv. SigA and SigA-Inv must be transmitted at approximately the same power level and location.

Alternate Embodiment

Another embodiment of this invention is to use the low frequency signal with embedded information (the Information Signal) to encode two copies of the carrier signal. In other words, two copies of a carrier are made. The Information Signal is used to modulate the carrier frequency resulting in SigA. A copy of the carrier is made, in phase with the first copy of the carrier. A copy of the information carrying signal is delayed so that it is 180 degrees out of phase with the original information carrying signal. This 180 degrees out of phase signal is then used to modulate the in phase copy of the carrier signal (SigA-Inv). The result is two versions of the carrier, one which is modulated by the information signal, and the other which is modulated by the information signal 180 degrees out of phase. Each of the two signals are transmitted in a different one of the two polarities as in the examples above (FIG. 5).

When the two signals are received together in the mobile application, the two signals are mixed with the carrier frequency described above, leaving the two out of phase signals which then cancel. All that will remain is SigB which will also have been mixed with a carrier signal (see FIG. 6). However, mixing with a carrier signal is part of the decoding part of a reception, and the signal can be processed normally to recover the embedded information.

Figure 6:
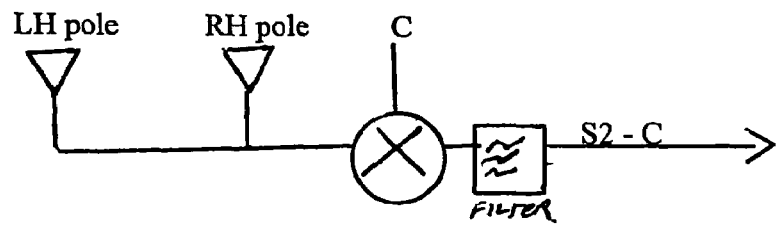
FIG. 6 shows that detect S1, both the LH polarity and RH polarity are received together and to detect S2, just the LH pole is picked up and sent to the receiver.
Figure 6:
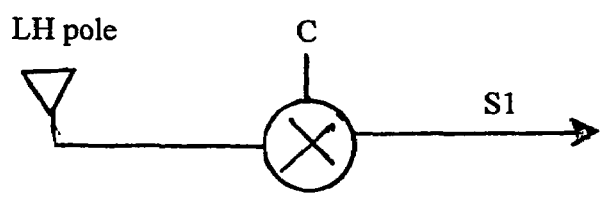

To receive SigA, a fixed antenna with the same polarization scheme as the transmit antenna is used to pick up the LCP signal, which is decoded normally (See FIG. 6).

CONCLUSION

It is possible to transmit to mobile users and users who do not have antennas aligned to the transmitter, and then reuse the same frequencies for transmissions to antennas that are fixed and in alignment with the transmitting antenna. The above described means discloses how this can be accomplished.

I claim:

1. A method of transmitting two different signals on the same frequency comprising:
    transmitting a first signal on one polarity, and the inverse of the first signal in the opposite polarity;
    transmitting a second signal on one of the polarities;
    performing one of:
        receiving the two signals with an antenna that picks both polarities, resulting in canceling of the first signal on one polarity and the inverse of the first signal in the opposite polarity, and decoding of the second signal; and picking up the first of the two signals with an antenna that is aligned to the transmitting antenna and with the same polarization scheme to receive just the first of the two signals.

2. The method of claim 1 further comprising using a circular polarity transmitting antenna in conjunction with a linear polarity receive antennas.

3. The method of claim 1 further comprising using linear polarity transmitting antennas in conjunction with a circular polarity receive antennas.

4. The method of claim 1 wherein the first signal comprises an information signal used to modulate a carrier, and the inverse of the first signal comprises a copy of the carrier of first signal modulated by the same information signal delayed to be 180 degrees out of phase.

5. A method for transmitting two different signals on the same frequency comprising:

transmitting a first signal on one polarity, and the inverse of the first signal in the opposite polarity;

transmitting a second signal on both of the polarities;

receiving the first and second signals with an antenna that picks up both polarities, resulting in canceling of the first signal on one polarity, and the inverse of the first signal in the opposite polarity, and the second signal transmitted on both polarities summing.

6. The method of claim 5, wherein said antenna is aligned to receive said first and second signals in one of said polarities.

7. A method of transmitting two different signals on the same frequency comprising:

transmitting by a transmitting antenna, a first signal on one polarity, and the inverse of that same signal in the opposite polarity;

transmitting a second signal on both of the polarities;

selecting one of the two polarities to receive the combined first signal and second signal with a receiving antenna feed aligned to the transmitting antenna; and subtracting the second signal received from the combined first signal so that the first signal can be decoded.

8. The method of claim 7 further comprising using a circular polarity transmitting antenna and linear polarity receive antenna.

9. The method of claim 7 further comprising using linear polarity transmitting antennas and a circular polarity receive antenna.

* * * * *